United States Patent

Alphen

[11] 4,024,387
[45] May 17, 1977

[54] HEADLAMP CONTROL SYSTEMS

[75] Inventor: Jacques M. Alphen, Saint-Cloud, France

[73] Assignee: Cibie Projecteurs, Bobigny, France

[22] Filed: Jan. 2, 1975

[21] Appl. No.: 538,074

[30] Foreign Application Priority Data

Oct. 2, 1974 France .............. 74.33202

[52] U.S. Cl. .............. 240/7.1 LJ; 240/7.55; 240/61.1
[51] Int. Cl.² .............. B62J 5/02
[58] Field of Search .............. 240/7.1 LJ, 7.55, 61.1, 240/62.3, 58, 61

[56] References Cited

UNITED STATES PATENTS

| | | | |
|---|---|---|---|
| 1,090,982 | 3/1914 | Hawthorne | 240/58 |
| 2,335,676 | 11/1943 | Humphrey | 240/58 X |
| 3,099,400 | 7/1963 | Holmes | 240/7.55 |
| 3,316,397 | 4/1967 | Yssel | 240/62.3 |
| 3,402,287 | 9/1968 | Hindman | 240/62.3 |
| 3,453,424 | 7/1969 | Cibie | 240/7.1 LJ |
| 3,643,082 | 2/1972 | Fleury | 240/7.1 LJ |
| 3,840,730 | 10/1974 | Andres et al. | 240/7.1 LJ |

FOREIGN PATENTS OR APPLICATIONS

| | | | |
|---|---|---|---|
| 840,518 | 1/1939 | France | 240/58 |
| 416,769 | 12/1946 | Italy | 240/58 |
| 823,617 | 11/1959 | United Kingdom | 240/7.55 |

*Primary Examiner*—L. T. Hix
*Assistant Examiner*—Alan Mathews
*Attorney, Agent, or Firm*—Alan H. Levine

[57] ABSTRACT

A motorcycle headlamp control system includes a ramp connected to the lower end of the front suspension and a lever connected to the upper end. The lever actuates a hydraulic transducer to vary the inclination of the headlamp.

7 Claims, 3 Drawing Figures

HEADLAMP CONTROL SYSTEMS

FIELD OF THE INVENTION

This invention relates to headlamp control systems for motorcycles or similar vehicles, and to motorcycles embodying such systems. The systems are arranged automatically to correct the vertical orientation of the headlamp in dependence on its attitude. The invention also relates to the automatic correction device provided with such a pickup system.

The term "attitude" as used herein denotes the position of the vehicle above the ground and the variation of such attitude is measured by detecting the angular variation, with respect to the ground, of a straight line drawn in the plane of longitudinal symmetry of the suspended part of the vehicle.

BACKGROUND OF THE INVENTION

As in the case of a motor-vehicle, the motorcycle attitude will vary with its load, the longitudinal profile of the road, the torque exerted on the driving wheel, braking and acceleration forces, effects due to aerodynamic forces, and the compression of the tyres. Other phenomena, e.g. relatively low-frequency pitching movements, may also result in variation of the attitude of a motorcycle. It should be noted that mean attitude variations increase in inverse proportion to the size of the wheel-base of the vehicle, and consequently these attitude variations are much greater in the case of a motorcycle than in the case of a conventional motor vehicle.

A number of automatic correction devices have already been previously proposed for motor vehicles, such as touring cars, trucks or the like. Devices of this kind are described, inter alia, in French Patents granted under the Nos. 1,358,632, 1,409,173, 1,418,215, 1,419,822, 1,438,576, 1,458,985, 1,475,011, and its First Certificate of Addition No. 93,855. All these various automatic correction devices for the vertical orientation of motor vehicle headlamps comprise means adapted to detect variations in the relative positions between the wheels and the vehicle chassis, and means for transmitting such information to a device for controlling the vertical orientation of each headlamp, such device acting on the latter through the agency of a control link articulated to a suitable point of said headlamp. In these various systems, the transmission means are of the type employing Bowden cables or levers, or of the hydraulic type.

Reference may be made more specifically to French Patent No. 1,475,011 which relates to a hydraulic device of the type comprising two mechanical transmission systems respectively associated with the front and rear parts of the vehicle and serving to detect movements of the suspended part of the vehicle in relation to the non-suspended part. Each of these transmission systems finally acts on a control lever, the end of which is displaced on either side of a mean position. In this known system, the end of each of the two control levers acts on a hydraulic pickup comprising a variable-volume chamber, the displacement of the lever end resulting in a variation of the volume of said chamber. The hydraulic outlets of the two pickups are interconnected by means of a hydraulic integrator circuit, in relation to which the said pickups are connected in opposition. This prior-art system also comprises a hydraulic control circuit extending from a point of the integrator circuit to a transducer relay acting on a first headlamp, and a connecting circuit connected in series with the control circuit, said transducer relay extending to a control element for the second headlamp. However, none of these prior-art devices can generally be so adapted as to be fitted to motorcycles. The main problem to be overcome, in fact, is due to the difficulty found in providing a front system adapted to detect the relative position of the fork of a motorcycle in relation to its front wheel and transmit such information to means for controlling the vertical orientation of the headlamp. In the great majority of cases, the headlamp is mounted on the fork of a motorcycle and when the latter is stationary the headlamp can be adjusted once and for all to a suitable level and hence orientation of its beam of light is closely linked to the motorcycle attitude. Any variation in the motorcycle attitude therefore has an adverse effect on the quality of the illumination.

SUMMARY OF THE INVENTION

According to one aspect of the invention a headlamp control system for a motorcycle or similar vehicle comprises detector means capable of detecting the position of a motorcycle fork relative to the front wheel, transducer means adapted to convert variations in said relative position into a displacement of fluid in a fluid circuit which circuit is adapted to be connected to a headlamp in order to control the vertical orientation thereof in dependance on the attitude of the motorcycle.

According to another aspect of the invention a motorcycle includes a variable length front suspension having upper and lower relatively displaceable sections, detector means capable of detecting the relative positions of the said displaceable sections, transducer means connected between said detector means and a fluid control circuit, the transducer being adapted to convert variations in the said relative positions into a displacement fluid in the fluid control circuit, and actuating means connected to control the vertical orientation of a headlamp in response to the said displacement of fluid.

According to a specific aspect of the invention a motorcycle includes a variable length front suspension having upper and lower relatively displaceable sections, a ramp rigidly connected to one of the said sections and having a ramp surface which is inclined to the direction of displacement of said upper and lower sections, a lever mounted to rotate about a horizontal pivot on the other of said sections, a first portion of said lever cooperating with said ramp surface and a second portion of said lever being connected to a transducer which converts relative movements of the lever and ramp into a displacement of control fluid in a fluid circuit, and actuating means connected to control the vertical orientation of the headlamp in response to said displacement of fluid.

The transducer may include a variable-volume chamber controlled by the said first portion of the lever, the said second portion being provided with a roller adapted to bear on the said ramp surface.

DESCRIPTION OF THE DRAWINGS

The invention will be described hereinafter in greater detail with reference to the accompanying drawings which are given by way of example without limiting force and wherein.

DESCRIPTION OF THE PREFERRED EMBODIMENT

Figure 1:
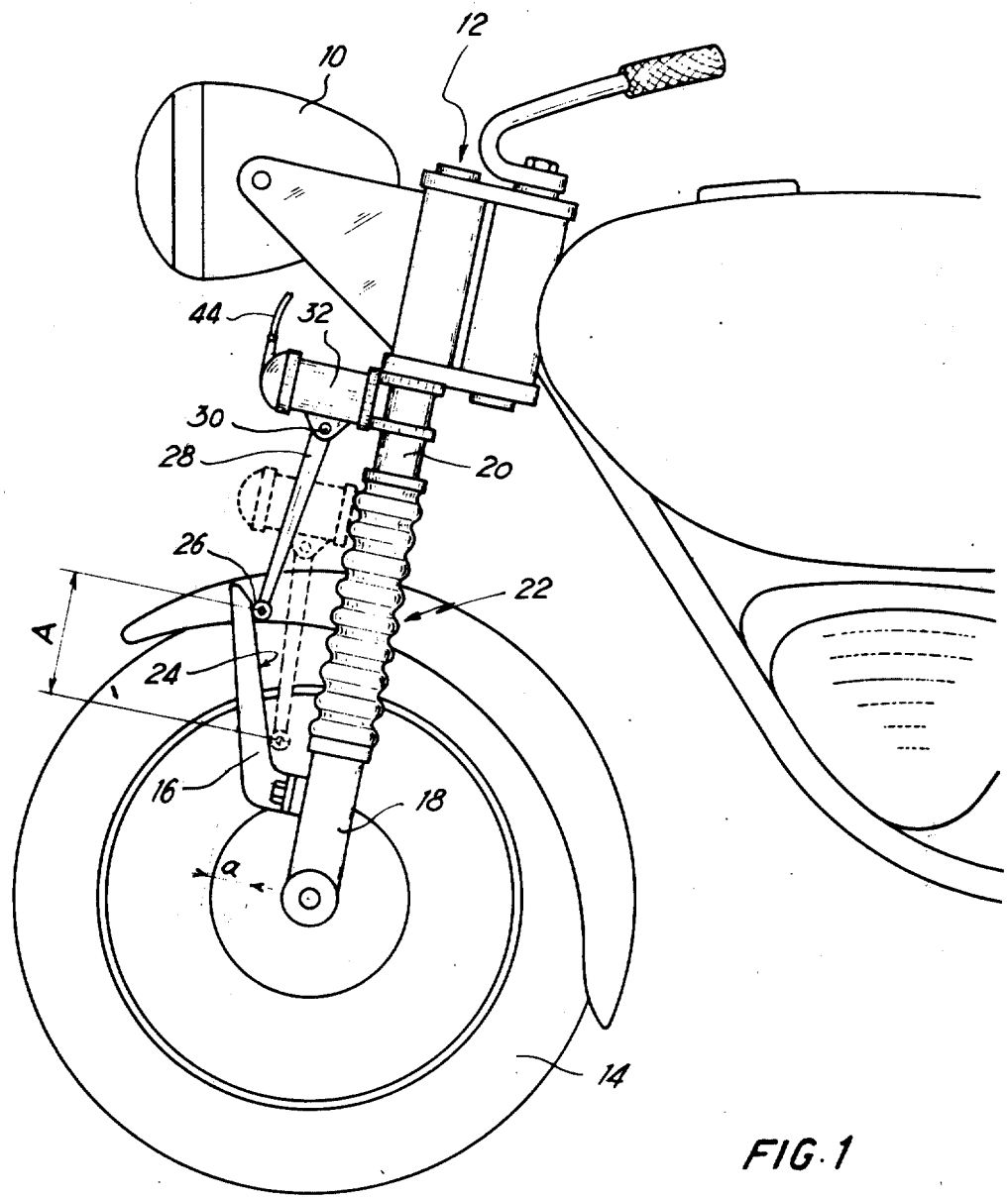
FIG. 1 shows the front part of a motorcycle equipped with a system constructed according to the invention.

FIG. 1 illustrates the front part of a motorcycle provided with a control system according to the invention intended for use in a device for the automatic correction of the vertical orientation of the headlamp 10 of a motorcycle independence on its attitude. The control system comprises, firstly, means for detecting the relative position of the motorcycle fork 12 in relation to the front wheel 14 and, secondly, transducer means adapted to convert the information obtained in this way into a displacement of fluid in a hydraulic circuit (not shown) in order automatically to control the headlamp orientation.

In the specific embodiment shown in FIG. 1, the above-mentioned detection means comprise a ramp 16 suitably inclined in relation to the direction of displacement of the upper and lower two parts 18 and 20 respectively of the telescopic suspension 22 of the motorcycle fork 12. The ramp 16 is fixed rigidly to the lower part 18 of the suspension 22 by a conventional means known per se. The effective surface 24 of the inclined ramp 16 is adapted to receive a roller 26 mounted to rotate on the bottom end of the lever 28. The said lever 28 is adapted to rotate about a horizontal pivot 30 rigidly secured to a transducer 32. The latter is a hydraulic transducer rigidly secured to the top part 20 of the telescopic suspension 22 of the motorcycle fork 12. The top end (not visible in FIG. 1) of the lever 28 controls the displacement of a moving element, e.g. a valve spool, in such a manner that the relative displacement of the two parts 18 and 20 of the telescopic suspension 22 results in pivoting of the lever 28 about its pivot 30, thus producing a displacement of fluid in the hydraulic circuit automatically controlling the vertical orientation of the headlamp 10. It will be seen therefore that the cooperation of the bottom end of the lever 28 mounted pivotally on the transducer 32 and the effective surface 24 of the inclined ramp 16 results in converting a non-vertical rectilinear movement (i.e. the relative displacement of the two parts 18 and 20 of the telescopic suspension 22) into a pivoting movement about the horizontal orientation axis, i.e. pivot 30. The hydraulic output 44 of the transducer 32 is connected to a hydraulic circuit controlling the headlamp orientation as described in greater detail hereinafter with reference to FIG. 3.

Referring to FIG. 1, A denotes the travel of the fork 12 and a denotes the travel of the pick-up system. The relative movement of the fork assembly 12 in relation to the wheel 14 takes place along the axis of the telescopic suspension 22 and has a relatively large travel. When it is required to use this relative movement, it is very desirable to reduce its travel as far as possible. The reason for this is of course that the displacement of fluid in the hydraulic headlamp control circuit must be considerably attenuated in relation to the maximum travel A of the fork.

Consequently, in the specific embodiment illustrated in FIG. 1, the inclination and length of the effective surface 24 of the ramp 16 are accurately determined so that the travel a transmitted to the pickup is reduced in relation to the travel A of the fork. This is very clear from FIG. 1 which shows the pickup 32 with the lever 28 in solid lines when it is situated in its highest possible position, and in broken lines when it is situated in the lowest possible position.

Since each absolute variation of the motorcycle attitude must result in an identical displacement of the fluid in the hydraulic control circuit, irrespective of the relative position of the two parts 18 and 20 in relation to one another, so as to produce a corresponding and identical variation of the headlamp 10, the effective surface 24 of the inclined ramp 16 is a plane surface. Similarly, the bottom end of the lever 28 and the roller 26 associated therewith receive a rectilinear movement.

Figure 2:
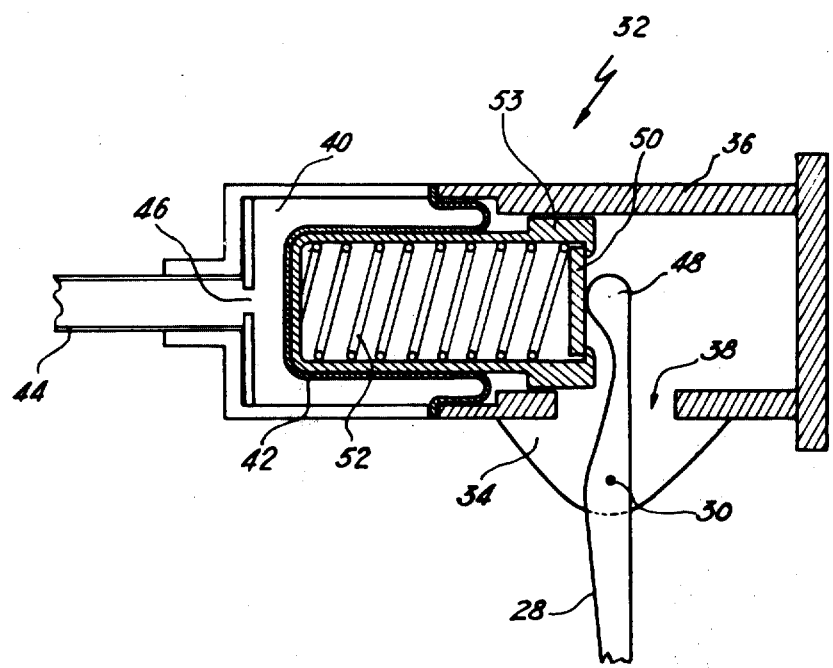
FIG. 2 shows a specific embodiment of a hydraulic pickup adapted for use in a control system according to the invention.

FIG. 2 is a section on an enlarged scale showing one specific embodiment of the transducer 32 shown in FIG. 1. The travel transmitted to the transducer 32 results in a pivoting movement of the lever 28 about its pivot 30 mounted on a support 34 connected to the transducer 32. The latter comprises a body 36 formed with an aperture 38 in the rear part, such aperture enabling the top part of the lever 28 to pass inside the body 36. The front part of the hydraulic transducer comprises a variable-volume hydraulic chamber 40 bounded by a flexible diaphragm 42 which advantageously consists of a very flexible diaphragm made from a composite fabric consisting of rubber and a material such as Tergal. Diaphragms of this kind are available commercially under the name "Bello-Fram". Because of their great flexibility, a diaphragm of this kind can undergo deformation to follow any displacement imparted to it, the deformation of the diaphragm being the cause of the variations in the volume of the chamber 40.

The hydraulic outlet 44 of the transducer 32 is provided with a calibrated orifice 46. The top end 48 of the lever 28 abuts a sliding member 50 which acts on the flexible diaphragm 42 through the agency of a prestressed spring 52 and a piston 53. Any pivoting of the lever 28 about its pivot 30 therefore produces a variation in the volume of the chamber 40 and this results in a displacement of fluid in the hydraulic control circuit connected to the transducer via its outlet 44. When the movement is transmitted from the lever 28 to the diaphragm 42, the spring 52 also acts as a damper.

The operation of the control system described above is as follows. A relative downward deflection of the suspended front part of the motorcycle results in a reduction of the volume of the chamber 40, while an upward deflection of the front suspended part of the motorcycle results in an increase in the volume of the chamber 40.

This invention also relates to the complete automatic system for vertical orientation of the headlamp of a motorcycle in dependence on its attitude. This system, which is shown diagrammatically in FIG. 3, comprises, in addition to the above-described pickup system, a rear detector element adapted to detect the relative position of the rear suspended part of the motorcycle in relation to the rear wheel, this rear detector element being coupled to a second hydraulic transducer 56 of the same type as that described before. In the specific case of FIG. 3, the rear transducer 54 is rigidly fixed to the motorcycle frame, and provided with a lever 56 mounted pivotally on an arm 58. The latter is fixed at a suitable point at the fork 60 which is mounted pivotally on the motorcycle frame and is intended to control the rear motorcycle wheel so as to maintain said wheel 62 in perfect alignment with said frame. The front transducer 32 and the rear transducer 54 are interconnected by a hydraulic integrator circuit 64. The two transducers 32 and 54 are connected in opposition in relation to the hydraulic integrator circuit 64 so that a relative downward deflection of the front suspended part of the motorcycle corresponds to a reduction in the volume of the chamber 40 of the front hydraulic transducer 32, while downward deflection of the rear suspended part of the motorcycle corresponds to an increase in the volume of the chamber of the rear hydraulic pickup 54. The hydraulic circuit section 64 is referred to as a hydraulic integrator circuit since a displacement of liquid is produced in the hydraulic control circuit 66 only if there is a difference in the relative front and rear movement. This displacement of fluid in one or other direction is of course proportional to the amplitude of the difference of the front and rear relative movements.

Figure 3:
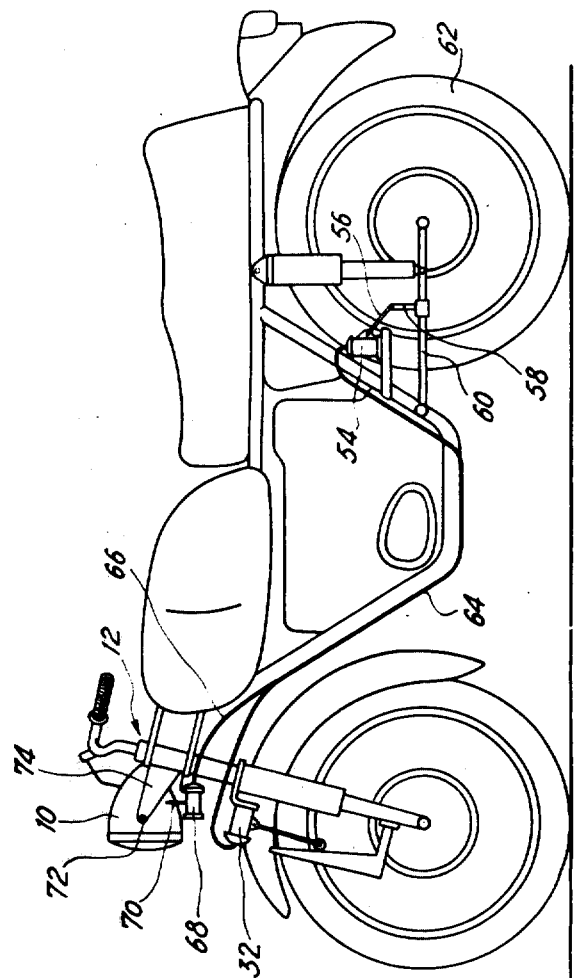
FIG. 3 diagrammatically illustrates a motorcycle provided with a device for automatic correction of the vertical orientation of the motorcycle headlamp, constructed according to the present invention.

In the specific embodiment shown in FIG. 3, the correction system comprises a hydraulic control circuit 66 connected at any point of the integrator circuit 64 and leading to a transducer element 68. This transducer element 68 controls the vertical orientation of the motorcycle headlamp 10 by means of a link 70 articulated at an appropriate point of the headlamp mounted pivotally on its pivot 72 which is in turn associated with the fork 12 through the agency of two triangular supports 74.

Of course the present invention is not limited to the embodiment described, and without departing from the scope of the invention it is quite possible to devise variants both of the pick-up system and of the complete correcting system according to the invention.

It should also be pointed out that the correction system according to the invention can without difficulty be superimposed on a second automatic correction system for the orientation of the beam of light of a motorcycle headlamp as described, for example, in applicants' French Patent No. 7,311,767 filed Apr. 2, 1973 and the First Certificate of Addition No. 7,409,042 filed Mar. 18, 1974.

What we claim as our invention and desire to secure by Letters Patent is:

1. A motorcycle including a variable length front suspension having upper and lower relatively displaceable sections, a headlamp pivotally mounted on said upper section, said headlamp being adjustable by pivotal movement about an axis substantially perpendicular to the optical axis of the headlamp, a ramp rigidly connected to one of the said sections and having a ramp surface which is inclined to the direction of displacement of said upper and lower sections, a lever mounted to rotate about a horizontal pivot on the other of said sections, a fluid circuit, a transducer, a first portion of said lever cooperating with said ramp surface and a second portion of said lever being connected to said transducer which converts relative movements of the lever and ramp into a displacement of control fluid in said fluid circuit, and actuating means connected to control the pivotal adjustment of the headlamp in response to said displacement of fluid.

2. A motorcycle as claimed in claim 1 in which the transducer includes a variable-volume chamber controlled by the said second portion of the lever, said first portion being provided with a roller adapted to bear on the said ramp surface.

3. A motorcycle as claimed in claim 1 in which the inclination of said ramp surface with respect to the direction of relative displacement of said upper and lower sections is such that the travel of said first portion of the lever in a direction perpendicular to said direction of relative displacement is less than the travel of said first portion of the lever in a direction parallel to said direction of relative displacement.

4. A motorcycle as claimed in claim 1 in which the said ramp surface is a plane surface such that said first portion experiences rectilinear movement.

5. A motorcycle including a variable length front suspension having upper and lower relatively displaceable sections, a headlamp pivotally mounted on said upper section, said headlamp being adjustable by pivotal movement about an axis substantially perpendicular to the optical axis of the headlamp, front and rear detector elements respectively adapted to detect the relative positions of said upper and lower relatively displaceable sections and the relative position of a rear part of the motorcycle in relation to the rear wheel, the front detector element comprising a ramp rigidly fixed to said lower displaceable section and having a ramp surface which is inclined to the direction of displacement of said upper and lower sections, a hydraulic control circuit, and front and rear hydraulic control devices repeatedly coupled to the two detector elements, the front hydraulic control device including a lever mounted to rotate about a horizontal pivot rigidly connected to said upper displaceable section, the lever having a portion thereof which cooperates with said ramp surface in such a manner that relative displacement of said upper and lower sections results in displacement of fluid in said hydraulic control circuit, and actuating means adapted to pivot said headlamp about an axis substantially perpendicular to the optical axis of the headlamp in response to said displacement of fluid.

6. A motorcycle as claimed in claim 5 in which said rear hydraulic control device is rigidly connected to a suspended part of the motorcycle frame and includes a lever, the lever being mounted to pivot on an arm which is rigidly connected to a rear oscillating fork which is adapted to control the rear wheel so as to maintain it in alignment with the motorcycle frame.

7. A motorcycle as claimed in claim 6 including a hydraulic integrator circuit interconnecting outlets of said front and rear hydraulic control devices in such a manner that these devices are mounted in opposition in relation to the said hydraulic integrator circuit.

* * * * *